US006756446B2

(12) United States Patent
Ding et al.

(10) Patent No.: US 6,756,446 B2
(45) Date of Patent: Jun. 29, 2004

(54) ENGINEERED POLYOLEFIN MATERIALS WITH ENHANCED SURFACE DURABILITY

(75) Inventors: Ruidong Ding, Arlington, TX (US); Clint Newell, Arlington, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

(21) Appl. No.: 10/269,888

(22) Filed: Oct. 15, 2002

(65) Prior Publication Data

US 2004/0072949 A1 Apr. 15, 2004

(51) Int. Cl.$^7$ .......................... C08L 9/00; C08L 23/00; C08L 23/04; C08L 25/02; C08L 33/02

(52) U.S. Cl. .................. 525/191; 525/201; 525/221; 525/232; 525/240; 525/241; 524/423; 524/424; 524/425; 524/442; 524/444; 524/445; 524/449; 524/451; 524/500; 524/515

(58) Field of Search ................. 525/191, 201, 525/221, 232, 240, 241; 524/423, 424, 425, 442, 444, 445, 449, 451, 500, 515

(56) References Cited

U.S. PATENT DOCUMENTS

| 2,971,939 A | 2/1961 | Baer |
| 3,236,917 A | 2/1966 | Natta et al. ................. 260/878 |
| 3,264,272 A | 8/1966 | Rees ......................... 260/78.5 |
| 4,000,216 A | 12/1976 | Lang .......................... 260/857 |
| 4,184,988 A | 1/1980 | Makowski et al. |
| 4,393,009 A | 7/1983 | Freitag et al. ............... 260/544 |
| 4,480,065 A | 10/1984 | Kawai et al. ................ 524/418 |
| 4,567,219 A | 1/1986 | Tominaga et al. .......... 524/413 |
| 4,578,429 A | 3/1986 | Gergen et al. .............. 525/291 |
| 4,868,245 A | 9/1989 | Pottick et al. ................ 525/98 |
| 4,888,391 A | 12/1989 | Domine et al. ............. 525/221 |
| 4,945,005 A | 7/1990 | Aleckner, Jr. et al. ...... 428/500 |
| 4,946,896 A | 8/1990 | Mitsuno et al. ............... 525/93 |
| 4,950,541 A | 8/1990 | Tabor et al. ................ 428/373 |
| 4,968,754 A | 11/1990 | Wong ......................... 525/285 |
| 4,972,020 A | 11/1990 | Shiraki et al. ................ 525/90 |
| 5,194,509 A | 3/1993 | Hasenbein et al. ......... 525/285 |
| 5,548,029 A | 8/1996 | Powers et al. .............. 525/195 |
| 5,585,420 A | 12/1996 | Grasmeder et al. ......... 523/400 |
| 5,880,198 A | 3/1999 | Kobayashi et al. ......... 524/451 |
| 5,883,188 A | 3/1999 | Hwang et al. ................ 525/71 |
| 5,971,869 A | 10/1999 | Rajagopalan et al. ....... 473/371 |
| 6,207,761 B1 | 3/2001 | Smith et al. ................ 525/221 |
| 6,384,122 B1 | 5/2002 | Hirakawa et al. ........... 524/451 |
| 6,403,721 B1 * | 6/2002 | Ding et al. .................. 525/191 |
| 6,423,779 B2 | 7/2002 | Sue et al. .................... 525/191 |
| 6,509,416 B2 * | 1/2003 | Ding et al. .................. 525/191 |

FOREIGN PATENT DOCUMENTS

| EP | 0 794 225 A1 | 10/1997 |
| EP | WO 00/66642 | 9/2000 |
| JP | 10219040 | 10/1998 |
| WO | WO 93/25617 | 12/1993 |
| WO | WO 97/38050 | 10/1997 |

* cited by examiner

*Primary Examiner*—Nathan M. Nutter
(74) *Attorney, Agent, or Firm*—Winston & Strawn LLP

(57) ABSTRACT

A polyolefin resin blend is presented that includes a base component of a semi-crystalline polyolefin component, a propylene-based polyolefin-metal salt, and a styrenic block ionomer. Optionally, the blend includes a thermoplastic elastomer, such as a hydrogenated styrene-butadiene random copolymer. Such blends have enhanced scratch and mar resistance while still retaining acceptable impact toughness. Methods of preparing such blends, as well as resultant articles including such blends, are also part of the invention.

24 Claims, 1 Drawing Sheet

Scratch Rating Scale

| 1 No Visible Scratch | 2 Slight Deformation | 3 Slight Ribbing | 4 Continuous Ribbing | 5 Continuous Tearing |
|---|---|---|---|---|

ENGINEERED POLYOLEFIN MATERIALS WITH ENHANCED SURFACE DURABILITY

FIELD OF THE INVENTION

The invention relates to polyolefin resin blends having superior physical properties including enhanced scratch resistance, rigidity, and toughness. The invention also relates to the process of manufacturing such polyolefin resin blends and to articles produced from such polyolefin resin blends.

BACKGROUND ART

In numerous applications, such as many in the automotive industry, a polymeric material that exhibits a good level of scratch resistance balanced with rigidity and impact toughness is desired. These properties tend to vary, however, such that efforts to enhance one will often result in deterioration of one, or both, of the other beneficial properties.

Polypropylene blends are useful in a wide variety of applications due to their strength, environmental resistance, and processability. While highly crystalline polypropylene does exhibit good mar and scratch resistance, it does not possess the impact toughness required in many important applications such as the making of automobile parts. Special polymeric materials have been developed that overcome this problem to some degree.

Attempts to remedy polypropylene's deficiency in impact toughness by blending with impact modifying copolymers of ethylene and other alpha-olefins, terpolymers of ethylene, other alpha-olefins, and dienes have not been completely successful. Elastomer modified polypropylene blends, also known as thermoplastic polyolefins, have the advantage of improved toughness, especially for cold temperature impact. They are widely used for formed or shaped articles, such as automotive parts, toys, furniture, and housing products. Although the impact toughness of those compositions is improved by these modifiers, the scratch resistance has been found to decrease. That is, the scratch resistance of polypropylene blends containing impact modifiers, such as ethylene-propylene copolymers, ethylene-propylene terpolymers, ethylene-butene copolymers, or ethylene-octene copolymers, is poor.

Increasing the crystallinity of the polypropylene to obtain a harder surface, and/or adding hard mineral filler to these blends, has been attempted as a countermeasure but without complete success. One conventional method to enhance surface characteristics is to use inorganic particulate material. Uniform dispersion of these particulates is difficult to achieve, however, and this tends to result in non-uniform surface properties in such products. The use of these particulates also tends to damage other desirable physical properties of the polyolefin, resulting in loss of impact strength and/or toughness. Debonding of such particulates from the polyolefin system also contributes to stress whitening, which is not desirable.

Another conventional way to enhance surface characteristics of various articles is to apply acrylic polymers or coatings to an article and subsequently cure the polymer or coating with a radiation source, such as ultraviolet radiation.

A method to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 microns. The surface altering agent is preferably prepared by an endopolymerization, which is used with a compatible polyolefin to be altered.

U.S. Pat. No. 5,880,198 describes thermoplastic resin compositions comprising polypropylene, a styrene containing elastomer, and talc, and having an acceptable balance of toughness and rigidity. The disclosure stresses the importance of the proportions of each component used to achieve this balance. In U.S. Pat. No. 6,384,122, a similar balance of properties is reported for a thermoplastic resin comprising an ethylene-propylene based polymer composition, an ethylene alpha-olefin copolymer based rubber and/or a rubber containing vinyl aromatic compounds and talc. Another example of a composition that provides an acceptable balance of toughness and rigidity is reported in Japanese Patent Application 10219040A for a resin composition consisting of a polyolefin based resin and a block copolymer based on aromatic vinyl and butadiene monomer units. Polymer blends which can be formed or shaped into lightweight and durable articles useful, for example, as automobile parts, toys, housings for various types of equipment, and the like, are well known in the art.

The physical and/or chemical properties of the thermoplastic polyolefin blends can be modified either by blending them with other thermoplastic polymers, or by incorporating into them materials having one or more polar groups, or both. For example, U.S. Pat. No. 4,946,896 describes a thermoplastic polyolefin comprising 20–80 weight percent polypropylene; 5–38 weight percent of an ethylene copolymer consisting of ethylene, an ester unit of either alkyl acrylate or methacrylate, and an unsaturated dicarboxylic acid anhydride; and 5–70 weight percent ethylene-propylene rubber. Similarly, U.S. Pat. No. 4,888,391 describes a polyolefin composition comprising a blend of a polyolefin as the continuous phase with an ethylene/acrylate/acrylic acid terpolymer as a discontinuous phase. These polyolefin-based blends are paintable. Another example of improving both scratch and impact resistance is reported in U.S. Pat. No. 6,423,779, where polypropylene and a polyphenylene oxide resin are blended together with a compatibilizer.

Despite these prior art formulations, there remains a need to obtain polymeric materials that have a good level of mar/scratch resistance along with the physical property requirements of rigidity, strength, processability, and low temperature impact toughness. The present invention provides certain blends that meet these needs.

SUMMARY OF THE INVENTION

The present invention relates to a polyolefin resin blend comprising: from about 10 to 90 weight percent of a semi-crystalline polyolefin; from about 0.1 to about 50 weight percent of a propylene-based polyolefin-metal salt, from about 0.1 to about 50 weight percent of a styrenic block ionomer. The propylene-based polyolefin-metal salt is advantageously a reaction product of a propylene-containing homopolymer or copolymer and at least one organic monomer containing at least one hydrophilic moiety. Furthermore, the reaction product is at least partially neutralized with at least one metal ion.

The styrenic ionomer is typically a styrenic block ionomer, although in preferred embodiments it can include mixtures thereof with a polymeric metal salt component. The optional but preferable polymeric metal salt is typically a reaction product of (a) a random styrenic copolymer which includes at least one unsaturated dicarboxylic acid derivative incorporated into the styrene backbone; and (b) at least one metal ion present in an amount sufficient to at least partially neutralize each type of unsaturated dicarboxylic acid derivative of (a). Also, the styrenic block ionomer is preferably a reaction product of a styrenic block copolymer modified with at least one polar group, the reaction product being at least partially neutralized with at least one metal ion. Each metal ion used to at least partially neutralize the reaction products disclosed herein independently includes lithium, sodium, potassium, magnesium, calcium, barium, lead, tin, zinc, aluminum or mixtures thereof.

The polyolefin resin blend preferably includes the semi-crystalline polyolefin in an amount of from about 15 to about 85 weight percent, the propylene-based polyolefin-metal salt in an amount from about 1 to about 45 weight percent, and the styrenic block ionomer in an amount of from about 1 to about 45 weight percent of the polyolefin resin blend. Preferably, the semi-crystalline polyolefin is present in an amount of from about 20 to about 80 weight percent, the propylene-based polyolefin-metal salt is present in an amount of from about 2 to about 40 weight percent, and the styrenic block ionomer is present in an amount of from about 2 to about 40 weight percent of the polyolefin resin blend.

The semi-crystalline polyolefin preferably includes: one or more of homopolymers of propylene, homopolymers of ethylene, copolymers of propylene and a $C_2$ to $C_{20}$ alpha-olefin component, copolymers of ethylene and a $C_3$ to $C_{20}$ alpha-olefin component, or mixtures thereof. Also, it is useful for each hydrophilic moiety and each polar group to each independently include an ethylenically unsaturated carboxylic acid or carboxylic anhydride monomer, and preferably methacrylic acid, acrylic acid, maleic anhydride, or a mixture thereof The styrenic block ionomer, typically a styrenic block copolymer modified with at least one polar group, preferably includes a styrenic block segment and an elastomeric block segment that is optionally hydrogenated. This includes bocks of styrene-ethylene/butylene, styrene-ethylene/butylene-styrene, styrene-ethylene/propylene, styrene-ethylene/propylene-styrene, styrene-ethylene/propylene-styrene-ethylene-propylene, styrene butadiene, styrene-butadiene-styrene, styrene-butylene-styrene, styrene-butylene-butadiene-styrene, styrene-isoprene-styrene, or combinations thereof.

When included, the random styrenic copolymer of the polymeric metal salt preferably includes styrene-maleic anhydride. In one preferred embodiment, the polyolefin resin blend further includes an impact modifier in an amount from about 0.1 to about 40 weight percent. Preferably, the impact modifier is present in an amount from about 1 to about 20 weight percent and comprises a styrenic block copolymer, an hydrogenated styrene butadiene random copolymer, or mixtures thereof. If desired, a mineral filler can be included in an amount from about 1 to about 40 weight percent. The mineral fillers are generally present in an amount from about 5 to about 25 weight percent and preferably include talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

The invention also relates to an article made of one of the polyolefin resin blends disclosed herein.

Furthermore, the invention relates to a method of preparing an article from a polyolefin resin blend which includes: melt blending a semi-crystalline polyolefin resin component, a propylene-based polyolefin-metal salt and from a styrenic block ionomer component of the types described above so as to form a blend, wherein the melt blending is at a sufficiently high temperature so that each polymer is at least partially melted; and molding the blend into an article having a surface, wherein the surface of the article when subjected to a 20 Newton load has less than about a 3 on the scratch rating scale and has no ribbing or tearing.

BRIEF DESCRIPTION OF DRAWING

Further features and advantages of the invention can be ascertained from the following detailed description that is provided in connection with the drawing(s) described below.

DETAILED DESCRIPTION OF THE INVENTION

Figure 1:
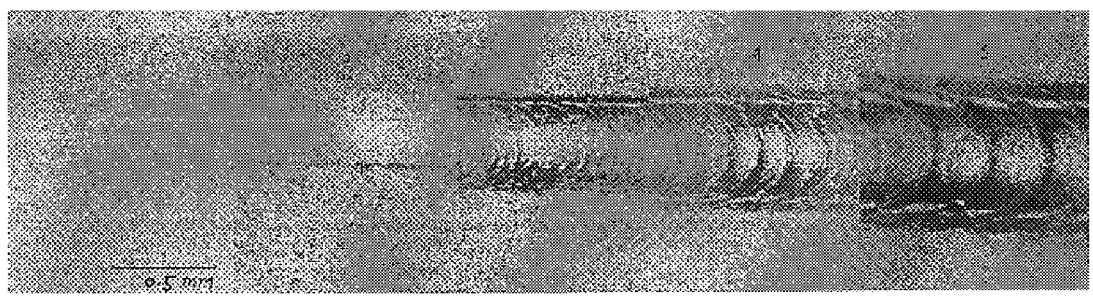
FIG. 1 is a visual representation of the Scratch Rating Scale.

It has now been discovered that polymeric blends having a good level of mar/scratch resistance can be obtained along with the necessary physical property requirements. These physical property requirements can include rigidity, strength, processability, low temperature impact toughness, or any combination thereof The present invention provides these polymeric blends by combining a semi-crystalline polyolefin, a propylene-based polyolefin-metal salt that is a reaction product of a propylene-containing homopolymer or copolymer and at least one organic monomer containing at least one hydrophilic moiety, the reaction product being at least partially neutralized with at least one metal ion, and a styrenic block ionomer, optionally including a polymeric metal salt.

The semi-crystalline polyolefin resin component is typically present in an amount of about 10 to about 90 weight percent, preferably about 15 to about 85 weight percent, and more preferably about 20 to about 80 weight percent, of the composition and is chosen from one or more of homopolymers of propylene, homopolymers of ethylene such as polyethylene, low density polyethylene, or high density polyethylene, copolymers of propylene and at least one other $C_2$ to $C_{20}$ alpha-olefin, copolymers of ethylene and at least one other $C_3$ to $C_{20}$ alpha-olefin, or mixtures thereof. Preferred alpha-olefins for such propylene and/or ethylene copolymers include ethylene, 1-butene, 1-pentene, 1-hexene, methyl-1-butenes, methyl-1-propenes, methyl-1-pentenes, methyl-1-hexanes, 1-octene, and 1-decene, or combinations thereof.

Propylene homopolymers or copolymers are preferred in one embodiment of the semi-crystalline polyolefin resin, i.e., copolymers having at least 50 weight percent propylene content in the polymer chain itself Suitable propylene homopolymers and copolymers are commercially available, for example, as PRO-FAX from Basell North America, Inc. of Wilmington, Del. and as FORTILENE, HP/P 9000, ACCTUFF or ACCPRO from British Petroleum Chemicals of Houston, Tex. The propylene-based polyolefin-metal salt can also include these or any other suitable propylene-based homopolymers or copolymers. Suitable ethylene homopolymers and copolymers are commercially available, for example, as ALATHON from Equistar Chemicals of Houston, Tex., as MARLEX from Chevron Phillips of Houston, Tex., as FORTIFLEX from Solvay America of Houston, Tex., and as ESCORENE from ExxonMobil of Houston, Tex.

The styrenic block ionomer is present in an amount from about 0.1 weight percent to about 50 weight percent, preferably from about 1 weight percent to about 45 weight percent, and most preferably from about 2 weight percent to about 40 weight percent of the composition. Optionally, one or more polymeric metal salts is also included.

The styrenic block ionomer is chosen from, e.g., unsaturated or saturated (i.e., hydrogenated or nonhydrogenated) styrenic block copolymers functionalized with at least one polar group, and the functionalized block copolymer is at least partially neutralized with a metal ion. Styrenic block copolymers useful in providing styrenic block ionomers include a styrenic block segment and an elastomeric block segment that can optionally, but in one embodiment preferably, be hydrogenated. The structure of the styrenic block segment can be of the linear or radial type, and of the diblock, triblock, or branched type. The styrenic block segment is preferably a polymer of styrene and/or its analogs and homologs, including alpha-methylstyrene, and ring-substituted styrenes, particularly ring-methylated styrenes. The preferred styrenics are styrene and alpha-methylstyrene, with styrene being especially preferred.

The elastomeric block segment of the above styrenic block copolymer may be ethylene, butylene, butadiene, isoprene, propylene, or a combination thereof. Preferred styrenic block copolymers include styrene-ethylene/butylene, styrene-ethylene/butylene-styrene ("SEBS"), styrene-ethylene/propylene, styrene-ethylene/propylene-styrene, styrene-ethylene/propylene-styrene-ethylene-propylene, styrene-butadiene, styrene-butadiene-styrene, styrene-butylene-styrene, styrene-butylene-butadiene-styrene, styrene-isoprene-styrene, or combinations thereof Among the polar groups that may be reacted or combined with such styrenic block copolymers to produce a functionalized styrenic block copolymer useful in the present invention are acid or anhydride or derivative thereof, such as one or more of carboxylic acid groups and their salts, anhydrides, esters, imide groups, amide groups, acid chlorides, and the like, which are grafted onto the elastomeric block segment of the styrenic block copolymer. Representative polar monomers include maleic, fumaric, acrylic, methacrylic, itaconic, crotonic, alpha-methyl crotonic, cinnamic, and the like, acids and their anhydride, ester and salt derivatives, if any. Exemplary styrenic block copolymers functionalized with polar groups are described in U.S. Pat. No. 4,578,429, U.S. Pat. No. 4,868,245, and U.S. Pat. No. 4,968,754, which are incorporated herein by express reference thereto. For example, polar groups can be included in an amount of about 0.1 to 10 weight percent of the total polyolefin resin.

Any combination of functionalizing compounds can be used, such as acrylic acid/methacrylic acid mixtures. Preferably, maleic anhydride, acrylic acid, methacrylic acid, or combinations thereof are used.

Such styrenic block copolymers functionalized with a polar group are commercially available, for example, as KRATON from Kraton Polymers of Houston, Tex., as SEPTON from Kuraray Company Ltd. of Pasadena, Calif., and as TUFTEC from Asahi America Inc. of Maiden, Mass.

The optional polymeric metal salt component included with the styrenic block ionomers discussed herein is a reaction product of a random styrenic copolymer which includes an unsaturated dicarboxylic acid derivative incorporated into the styrene backbone, which reaction product is at least partially neutralized with at least one metal ion. Alternatively, the polymeric metal salt is a random terpolymer of styrene, butadiene, and an unsaturated dicarboxylic acid derivative, or a reaction product thereof, which is at least partially neutralized with at least one metal ion. In one embodiment, the polymeric metal salt can include both the random styrenic copolymer reaction product and the neutralized random terpolymer. The preferred styrenic materials include styrene and alpha-methylstyrene, with styrene being especially preferred. Examples of a suitable unsaturated dicarboxylic acid derivative includes maleic acid, maleic anhydride, fumaric acid, mesaconic acid, itaconic acid, itaconic anhydride, and monomethyl maleate, or any combination thereof.

Procedures for preparing such random styrenic copolymers are known in the art and have been described in, for example, U.S. Pat. No. 2,971,939. Impact-modified versions can be produced for use according to the invention, for example, by copolymerizing the styrenic components and the unsaturated dicarboxylic acid derivative components in the presence of polybutadiene. Styrene-maleic anhydride copolymers, for example, are commercially available as DYLARK from Nova Chemicals Corporation of Calgary, Alberta, Canada, as CADON from Bayer Corporation of Pittsburgh, Pa., and as STAPRON from DSM Engineering Plastic Products, Inc. of Reading, Pa.

The reaction product of a random styrenic copolymer, which includes a polar group incorporated into the styrene backbone, is then advantageously at least partially neutralized with at least one metal ion, typically an alkali or alkaline-earth containing compound, for example a salt or a base, to form the styrenic ionomer(s). In a preferred embodiment, the polar group includes one or more unsaturated dicarboxylic acid derivatives. Preferably, each type of polar group is neutralized about 30 to about 100 percent, more preferably at least about 40 percent, and most preferably at least about 60 percent. Examples of suitable metal ions for any of the neutralizations of the invention can include lithium, sodium, potassium, magnesium; calcium, barium, lead, tin, zinc, aluminum, or a combination thereof. Zinc, lithium, sodium, calcium, or magnesium, or a combination thereof, are preferred.

A method for ionizing a modified block copolymer is taught in U.S. Pat. No. 4,972,020, which is incorporated herein by express reference thereto. In the '020 patent, aluminum hydroxide and a maleic anhydride grafted hydrogenated block copolymer are melt blended in a Brabender Plastograph at 200° C. for 5 minutes to form an ionically crosslinked modified block copolymer. Such reactions may be carried out in situ during extrusion of the blend in a twin-screw extruder. Alternatively, such reactions may be performed in a one-step process using functionalized styrenic block copolymer salts, polymeric metal salts, styrenic block ionomers, or mixtures thereof.

It is believed that polypropylene has excellent resistance to scratch and mar due in part to its high crystallinity. Pure polypropylene alone, however, has low impact resistance. Conventionally, the addition of elastomers such as ethylene- or styrene-containing copolymers improves impact strength, but tends to markedly worsen scratch and mar resistance. Thermally reversible ionic cross-linking of styrenic ionomers permits excellent entropic recovery after deformation which provides enhanced mar and scratch resistance in polyolefin blends compared to blends containing non-ionomeric styrene polymers or no styrenic component at all.

It is now believed, without being bound by theory, that the compatibility of semi-crystalline polyolefins with styrenic ionomers is further enhanced by the presence of propylene-based polyolefin-metal salts. The physical properties of the heterogeneous polymer blends are governed by the interfacial interactions between different phases. It is believed that propylene-based polyolefin-metal salt enhances dispersion of the blend composition, and increases interfacial interactions, leading to increased toughness in the blends of the invention. These interactions significantly influence blend morphology, dispersion, and distribution of polymer phases. The inclusion of propylene-based polyolefin-metal salts in a semi-crystalline polyolefin and styrenic ionomer blend significantly improves the interfacial strength of the polymer phases, due probably to ionic bonding, and yields a thermoplastic resin with an excellent balance of scratch resistance, stiffness, and impact resistance according to the invention.

The propylene-based polyolefin-metal salt is present in an amount of about 0.1 weight percent to about 50 weight percent, preferably about 1 weight percent to about 45 weight percent, most preferably 2 weight percent to about 40 weight percent of the blend composition. The same concentrations apply to embodiments incorporating copolymers of propylene and carboxylic acid or anhydride monomers, or propylene-containing polymers grafted with a functional group that are partially or completely substituted for propylene-based polyolefin metal salts.

The propylene-based polyolefin-metal salts of this invention have a backbone of a homopolymer or one or more copolymers of propylene and up to about 20 mole percent ethylene or other alpha-olefins having up to about 12 carbon atoms. If a copolymer, this polyolefin backbone can be random, block or graft with a $C_2$ to $C_{20}$ alpha olefin. At least a fraction of this polyolefin backbone is preferably grafted with an unsaturated organic compound containing at least one site of unsaturation and at least one carbonyl or carboxyl or other hydrophilic group.

When included, these functional moieties are added to the polyolefin backbone in an amount of at least about 0.01 weight percent, preferably at least about 0.1 weight percent, and more preferably at least about 0.5 weight percent, based on the combined weight of the polymer and the hydrophilic organic compound. The maximum amount of unsaturated organic compound content can vary as desired, but typically it should be no more than about 25 weight percent, often it should be no more than about 10 weight percent, and in certain preferred cases it should be no more than about 5 weight percent, based on the combined weight of the polymer and organic compound. Typical polyolefin-metal salts include P/Y copolymers, where: P is the olefinic backbone, such as propylene and/or ethylene; and Y is the functional comonomer, such as acrylic or methacrylic acid, present in an amount of about 0.01 percent to about 20 weight percent, preferably about 0.5 percent to about 5 weight percent, of the polymer.

An unsaturated hydrophilic organic compound can be grafted to the base polymer by any technique known to one of ordinary skill in the art, such as those taught in U.S. Pat. No. 3,236,917 and U.S. Pat. No. 5,194,509, both of which are incorporated herein by express reference thereto. For example, in the '917 patent, the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g., 210° to 300° C., and a free radical initiator is not used.

An alternative method of grafting is taught in U.S. Pat. No. 4,950,541, the disclosure of which is also incorporated herein by express reference thereto, by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Any hydrophilic monomer that can be neutralized, such as unsaturated carboxylic acid monomers, can be used in the manufacture of functionalized polyolefins of this invention. Representative unsaturated organic compounds that include at least one carbonyl group include the ethylenically unsaturated carboxylic acids, anhydrides, esters, and their salts, both metallic and nonmetallic, and combinations thereof. Preferably, the organic compound includes ethylenic unsaturation conjugated with the carbonyl group. Representative compounds include maleic, fumaric, acrylic, methacrylic, itaconic, crotonic, alpha-methyl crotonic, cinnamic, and the like, acids and their anhydride, ester and salt derivatives, if any, and any combinations thereof. Preferred combinations of functionalizing compounds include those such as acrylic acid/methacrylic acid mixtures. Preferably, maleic anhydride, acrylic acid, methacrylic acid, or combinations thereof are used.

The functionalized polymer, or "reaction product" thereof, is then advantageously neutralized with at least one metal ion, typically an alkali or alkaline-earth containing compound, typically a salt or a base, to form the functionalized polyolefin-metal salts. Preferably, the acid moiety (or moieties) on each of the ionomers and functionalized polyolefin-metal salts in a blend of this invention is (are) neutralized about 30 to about 100 percent, preferably at least about 40 percent, more preferably at least about 60 percent. The acid moiety is preferably neutralized with one or more alkali or alkaline earth metals, but other cations, or blends thereof, can be used. Examples of suitable cations include lithium, sodium, potassium, magnesium, calcium, barium, lead, tin, zinc, aluminum, or a combination of such cations. The preferred cations are zinc, lithium, sodium, calcium, magnesium, or a combination thereof. These cations are preferably added as bases to increase the degree of neutralization of acid moieties. Examples of metal-ion containing compounds include sodium carbonate, zinc acetate dihydrate, zinc oxide, zinc hydroxide, calcium oxide, calcium hydroxide, magnesium oxide, magnesium hydroxide, zinc stearate, calcium stearate, or combinations thereof. The metal-ion containing compounds include at least about 0.01 weight percent and no more than 20 weight percent of the compound of the present invention. In one preferred embodiment, the metal-ion containing compounds includes about 0.01 weight percent to no more than 10 weight percent, while in another embodiment they are present in an amount of about 5 weight percent to no more than 20 weight percent.

The optional random styrenic copolymer included in a polymeric metal salt, which includes an unsaturated dicarboxylic acid derivative incorporated into the styrene backbone, or in general, a styrenic block copolymer functionalized with at least one polar group, which forms the basis of the styrenic ionomer and/or the functionalized polyolefin that forms the basis of the propylene-based polyolefin-metal salt, may be subsequently sulfonated before the neutralization step with the metal ion. Techniques for sulfonating polymers are well known to those of ordinary skill in the art, such as the one taught in U.S. Pat. No. 4,184,988, which is incorporated herein by express reference thereto. In the '988 patent, acetyl sulfate was added to a solution of EPDM and heptane; the reaction was terminated after 1 hour with the addition of isopropyl alcohol. This optional step results in a polymer containing both sulfonated and carboxylated groups, and this is preferred in one embodiment.

In one embodiment, the polyolefin resin blends include at least one each of: semi-crystalline polyolefin homopolymers and/or copolymers, propylene-based polyolefin-metal salts, and styrenic block ionomers. Preferably the polyolefin homopolymers and/or copolymers are predominantly polypropylene. In yet another embodiment, the polyolefin resin blends include polypropylene or polyethylene homopolymers and/or copolymers, or mixtures thereof, propylene-based polyolefin-metal salts, and styrenic block ionomers.

In another embodiment, the polyolefin resin blends include polypropylene or polyethylene homopolymers and/or copolymers, or mixtures thereof, propylene-based polyolefin-metal salts and/or copolymers of propylene and carboxylic acid or anhydride monomers, and styrenic block ionomer formed from SEBS modified with a polar group, which modified SEBS is then at least partially neutralized with at least one metal ion.

In yet another embodiment, the polyolefin resin blends include a semi-crystalline polyolefin; a reaction product of an unsaturated propylene-containing polymer functionalized with a hydrophilic moiety, in particular carboxylic acids, and a reaction product of a styrenic block copolymer functionalized with at least one polar group, in particular carboxylic acids, and optionally a reaction product of a random styrenic copolymer which includes an unsaturated dicarboxylic acid derivative incorporated into the styrene backbone, each reaction product separately or concurrently being at least partially neutralized with at least one metal ion.

In yet another embodiment, the polyolefin resin blends include a reaction product of an propylene-containing polymer functionalized with a hydrophilic moiety, in particular carboxylic acids, that is at least partially neutralized with a metal ion; and a styrenic block ionomer reaction product of a styrenic block copolymer functionalized with at least one polar group, in particular carboxylic acids, that is at least partially neutralized with at least one metal ion.

In one embodiment, the polyolefin resin blend can include copolymers of propylene and carboxylic acid or anhydride monomers substituted for some or all of the propylene-based polyolefin-metal salts. In another embodiment, the polyolefin resin blend includes styrenic block ionomer in the form of one or more styrenic copolymers grafted with at least one functional group. In yet another embodiment, the polyolefin resin blend optionally further includes a polymeric metal salt including random styrenic copolymers which are comprised of an unsaturated dicarboxylic acid derivative incorporated into the styrene backbone.

In one embodiment the functionalized polymers are exclusively propylene-based polyolefin-metal salts and styrenic block ionomers, which have been formed as reaction products when propylene-based functionalized polyolefins and styrenic block copolymers grafted with at least one functional group are at least partially neutralized with at least one metal ion. In another embodiment the functionalized polymers are exclusively propylene-based polyolefin-metal salts and polymeric metal salts, which have been formed as reaction products when propylene-based functionalized polyolefins and, optionally, random styrenic copolymers which include an unsaturated-dicarboxylic acid derivative incorporated into the styrene backbone, are at least partially neutralized with at least one metal ion.

A component that is optionally, but preferably, present in one embodiment of the polyolefin resin blend is an impact modifier. This is preferably a thermoplastic elastomer including one or more styrenic block copolymers. Acceptable styrenic block copolymers include, but are not limited to, copolymers of styrene, ethylene and another alkene. Exemplary copolymers include styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butadiene, styrene-butylene-styrene, styrene-isoprene-styrene, and hydrogenated variations or any combinations thereof. Suitable styrenic block copolymers also include styrene-butadiene-styrene, styrene-butene-butadiene-styrene, alpha-methylstyrene-butadiene-alpha-methylstyrene, alpha-methylstyrene-isoprene-alpha-methylstyrene, and the like, or combinations thereof. The structure of the styrene block copolymers useful in the present invention can be of the linear or radial type, and of the di-block or tri-block type. In some embodiments the styrenic -block copolymers having at least four different blocks or a pair of two repeating blocks, for example, repeating styrene/butadiene or styrene/ethylene propylene blocks, can also be desirable.

The rubber portion of the styrene block copolymer may be either unsaturated or saturated. Block copolymers with unsaturated rubber monomer units may include homopolymers of butadiene or isoprene and copolymers of one or both of these two dienes with a minor amount of styrenic monomer. When such a block is hydrogenated, the resulting product is, or resembles, a regular copolymer block of ethylene and 1-butene. If the conjugated diene employed is isoprene, the resulting hydrogenated product is or resembles a regular copolymer block of ethylene and propylene. Hydrogenation of block copolymers with unsaturated rubber monomer units may be effected by use of a suitable catalyst component.

The impact modifier styrenic block copolymer component, when used, can make up from about 0.1 to about 40 weight percent, more preferably from about 1 to about 20 weight percent, and in one embodiment even more preferably about 5 to about 15 weight percent of the overall polyolefin blend. Of course, quantities less than 0.1 weight percent can be used but will have minimal effect on the properties of the blend.

An hydrogenated styrene butadiene random copolymer may be used in place or in addition to the styrenic block copolymer as an impact modifier, and is optionally, but in one embodiment preferably, present in an amount from about 0.1 to about 40 weight percent, more preferably from about 1 to about 20 weight percent, and even more preferably about 5 to about 15 weight percent of the overall polyolefin- resin blend.

Exemplary styrenic block or random copolymers are available from Kraton Polymers of Houston, Tex. under the trademark KRATON, from Japan Synthetic Resin of Tokyo, Japan under the trademark DYNARON, from Asahi America Inc. of Malden, Mass. under the trademark TUFTEC, and from Phillips Petroleum Co., Inc. of Bartlesville, Okla. under the trademark K-RESIN.

The polyolefin resin blends can optionally include other property-modifying ingredients to the extent that the presence of such additives does not interfere with the performance of the compositions, e.g., the scratch and mar resistance, and, in some cases, the impact toughness and/or paintability. For instance, examples of optional modifying ingredients include processing aids, such as calcium stearate; primary antioxidants, such as IRGANOX 1010 or 1076 phenolic antioxidants (available from Ciba Specialty Chemicals of Tarrytown, N.Y.), secondary antioxidants such as IRGANOX 168 phosphite (available from Ciba) or SANDOSTAB PEPQ phosphonite (available from Clariant Corporation of Charlotte, N.C.) or Ultranox phosphite (available from General Electric Specialty Chemicals of Parkersburg, W.Va.); ultraviolet light stabilizers, such as carbon black; hindered amine light stabilizers such as Tinuvin and Chimassorb brands (available from Ciba Specialty Chemicals of Tarrytown, N.Y.); and ultraviolet light absorbers such as benzotriazole-based Tinuvin brands (available from Ciba Specialty Chemicals of Tarrytown, N.Y.); and benzophenone-based Cyasorb brands (available from Cytec Industries of Stamford, Conn.).

Another class of modifying ingredients are color concentrates, which when optionally included are typically present at concentrations ranging from about 0.01 to about 10 percent, typically from about 1 to about 5 percent.

Another example of a class of modifying ingredients are mineral fillers. The mineral filler can be a treated or untreated inorganic material, such as talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fibers, carbon fibers, clay, or a combination thereof. The mineral filler can optionally be present in an amount from about 0 to about 40 weight percent of the overall composition, typically from about 0.1 to 35 weight percent. When included, the mineral filler is preferably present in an amount from about 5 to about 25 weight percent.

Each optional ingredient can be admixed with the blend, admixed with the ingredients during manufacture of the blend. The present invention includes a method of manufacture of the above blends by, for example, extrusion. The polyolefin resin blends of this invention are mixed by any conventional manner that insures the creation of a relatively homogeneous blend. Optional ingredients can also be prepared in the form of a masterbatch with one or more of the other primary or optional ingredients of the invention.

The polyolefin resin blends of the present invention have excellent scratch resistance, high rigidity, and toughness. It is preferred that these blends are also paintable.

One method of manufacturing propylene-based polyolefin-metal salts includes the steps of contacting a propylene-containing polymer and at least one organic monomer containing at least one hydrophilic moiety under conditions such that the propylene polymers are functionalized with each hydrophilic moiety, and neutralizing the reaction product with at least one type of metal ion.

One method of manufacturing polymeric metal salts includes contacting a styrenic block copolymer and at least one polar group and at least partially neutralizing the copolymer with one or more metal ions. Optionally, a polymeric metal salt including one or more random styrenic copolymers which is comprised of an unsaturated dicarboxylic acid derivative incorporated into the styrene backbone can also be contacted concurrently or sequentially.

One method of manufacturing styrenic block ionomers includes contacting a styrenic block copolymer and at least one polar group under conditions such that the styrenic block copolymers are functionalized with each polar group, and neutralizing the reaction product with one or more types of metal ions to form a styrenic block ionomer. The step of neutralizing the functionalized styrene block copolymer with metal ion(s) can be accomplished approximately at the same time as the blending with the polyolefins. In one embodiment, an already functionalized propylene-containing polymer can be added as a separate component.

The manufacture of propylene-based polyolefin-metal salts and styrenic block ionomers can be performed in a single reaction mass. Optionally, such reactions may also be performed in a one-step process using one or more functional oligomeric salts.

The method of manufacturing a polyolefin resin blend of the invention includes providing semi-crystalline polyolefin resin components, providing propylene-based polyolefin-metal salts, providing styrenic block ionomers, providing any optional polymeric components, and blending the components to make a homogenous blend.

The functionalized polyolefin-metal salts and styrenic block ionomers may be formed continuously and simultaneously via melt blending of the primary components of the present invention (i.e., the propylene-containing polymer functionalized with a hydrophilic moiety, the styrenic block copolymer functionalized with a polar group, and the metal-ion containing component). Techniques for melt blending of a polymer with optional additives of all types are known in the art and can typically be used in the practice of this invention. Typically, in a melt blending operation useful in the practice of the present invention, the individual components of the composite are combined in a mechanical extruder or mixer, and then heated to a temperature sufficient to form a polymer melt. The mechanical mixer can be a continuous or batch mixer. Examples of continuous mixers are single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of batch mixers are lateral 2-roll mixers such as Banbury™ or Boling™ mixers.

The polyolefin resin blend may be prepared by shear mixing the components of the present invention in the melt at a temperature equal to or greater than the melting point of the polyolefin. "Melting point" is defined as the first order transition temperature at which a crystalline solid changes from a solid state to a fluid state. The temperature of the melt, residence time of the melt within the mixer, and the mechanical design of the mixer are several of the variables that control the amount of shear to be applied to the composition during mixing to provide a suitable polyolefin resin blend according to the invention.

In a preferred embodiment, the polyolefin resin blend is prepared by mixing the propylene-containing polymer functionalized with a hydrophilic moiety, the styrenic block copolymer functionalized with at least one polar group and optionally the random styrenic copolymer which includes an unsaturated dicarboxylic acid derivative incorporated into the styrene backbone, and the metal-ion containing component in a modular intermeshing co-rotating twin-screw extruder, such as those manufactured by Leistritz™. Other manufacturers of similar suitable types of equipment include co-rotating twin screw extruders from Berstorff™, Werner and Pfleiderer™, Japanese Steel Works, and others. The screw diameter for this type of mixer may vary from about 25 to 300 mm. Without being bound by theory, commercially viable production rates of the final polymer blend of the current invention should be achievable with screw diameters of at least about 70 mm.

A description of a conventional extruder can be found in U.S. Pat. No. 4,857,600, which is incorporated herein by express reference thereto, and includes a series of sections, or modules, which perform certain mixing functions on the composition. The polyolefin resin blend components are fed into the initial feed section of the extruder at the main feed hopper.

Other ingredients, such as fillers, thermal stabilizers, and others as described above, may also be fed into the main feed hopper of the mixing extruder as dry powders or liquids.

The components of the polyolefin resin blend are preferably homogenized with an initial melting and mixing section of the extruder. The polymer melt temperature is raised by a sequence of kneading blocks to just above the highest softening point of the polymer blend. Within this first mixing section of the extruder, it is desirous to maintain the polymer temperature above the melting point of the polymer blend within the time frame of the melting process of about 5 to 20 seconds. Although any suitable melt temperature can be used depending on the melting point of the polymeric materials being blended, a melt temperature of about 160° C. to 250° C. is preferred for the first mixing section.

Subsequent to the first mixing section, there is a second mixing section of the extruder to perform kneading and distributive mixing to ensure sufficiently uniform distribution of the components of the polyolefin resin blend. The mixing temperature in this section should be from about 160° C. to 270° C., preferably from about 170° C. to 260° C.

Another section of the mixing extruder includes melt compression prior to extrusion through a die plate. The melt compression can be accomplished, for example, with the co-rotating twin screw extruder, or melt compression can be done via a de-coupled process, such as a single screw extruder or a melt gear pump. At the end of the compression section, the composition is discharged through a die plate.

Alternatively, the functionalized propylene-based polyolefin-metal salts and the styrenic block ionomers can be blended with polypropylene to produce the improved polyolefin resin blends of the present invention.

Another aspect of the present invention is a method for making an article of manufacture including the step of molding the described polyolefin resin blend into a desired configuration and shape of the article of manufacture.

The present invention also includes the resultant molded blends and the finished articles made therefrom. Given the good balance of toughness and rigidity in the materials of the present invention, as well as other excellent properties noted previously, the polyolefin resin blends of the invention are suitable for many specialized applications. For example, this material can be shaped into components used in many interior and exterior automobile parts. Shaping, as used herein, could include any type of molding and/or extruding, with the injection molding of a blend of the recited components being preferred. Such finished articles have excellent scratch and mar resistance.

The molded articles from the compositions of these inventions exhibit high resistance to scratches and marring. These are important properties in certain commercial applications, though it should be understood that any given blend according to the invention need not have the improved properties in all of these categories.

The fabricated articles of this invention can be prepared by any known thermoplastic fabrication methods, and particularly by known thermoplastic molding methods, such as injection, compression, blow, spin/rotational, reaction injection and molding techniques.

As used herein, the term "polyolefin-metal salt" with a specific monomer preceding it, for example a "propylene-based polyolefin-metal salt," is a reaction product of a propylene-containing polymer and an organic monomer containing a hydrophilic moiety, which reaction product is at least partially neutralized with at least one metal ion. Typically, a propylene-based polyolefin-metal salt is a polymer wherein the polyolefin monomer, i.e., propylene, is present in a polyolefin at a concentration of at least about 80 percent, preferably at least 95 percent, before functionalizing the polyolefin, and where the polyolefin has then been functionalized with one or more hydrophilic moieties, such as carboxylic acid-containing or other hydrophilic moiety-containing unsaturated monomers, i.e., maleic anhydride. This functionalized polyolefin reaction product is advantageously at least partially neutralized with a metal ion.

As used herein, the term "styrenic ionomer" is a styrenic block ionomer, such as a styrenic block copolymer, that optionally includes a polymeric metal salt including styrene.

As used herein, the term "polymeric metal salt" is a reaction product of a random styrenic copolymer which is comprised of an unsaturated dicarboxylic acid derivative incorporated into the styrene backbone and at least one metal ion used to at least partially neutralize the unsaturated dicarboxylic acid in the reaction product.

As used herein, the term "styrenic block ionomer" is a reaction product of one or more styrenic block copolymers functionalized with a polar group, which reaction product is at least partially neutralized with a metal ion. Styrenic block copolymers include a styrenic block segment and an elastomeric block segment that may or may not be hydrogenated, i.e., optionally, and in one embodiment preferably, hydrogenated. The polar group is preferably an alpha, beta-ethylenically unsaturated carboxylic acid, or the anhydride thereof.

As used herein, the term "semi-crystalline" typically means that the crystallinity is at least about 30%, preferably at least about 50% and more preferably to about 80%.

The term "about," as used herein, should generally be understood to refer to both numbers in a range of numerals. Moreover, all numerical ranges herein should be understood to include each whole integer within the range.

EXAMPLES

These and other aspects of the present invention may be more fully understood with reference to the following examples, which are merely illustrative of preferred embodiments of the present invention and are not to be construed as limiting the invention.

The significance of the symbols used in these examples, the units expressing the variables mentioned, and the methods of measuring these variables, are explained below. The test specimens were prepared by injection molding using a HPM Command 90 Injection Molding Machine at a melt temperature of 200° C. and a mold cavity temperature of 18° C.

MFR [dg/min] Melt Flow Rate, measured in dg/min at 230° C., under a load of 2.16 kg, according to ASTM D-1238-99

Flexural modulus (kpsi) Flexural Modulus, measured as 1000 pounds per square inch at 23° C. and a test speed of 12.7 mm/min and a rectangular test specimen of dimensions ⅛"×½"×5", according to ASTM D-790-99

Tensile Strength (psi) Tensile strength, measured as pounds per square inch at 23° C., according to ASTM D-638-01

Impact resistance [ft-lb/in] Izod Pendulum Impact Resistance, measured at 23° C. as ft-lb/in after at least 40 hours of conditioning at 23° C., with a test specimen of dimensions ⅛"×½"×2.5" and a 45° notch, according to Test Method A of ASTM D-256-97

MAII Fail mode Multi-Axial Instrumented Impact, reported as type of failure (brittle or ductile) at 23° C. and a velocity of 5 miles per hour, according to ASTM D-3763-99

Scratch on Surface As described in text

In order to measure surface scratch resistance, the Ford Laboratory Test Method BN 108-13 "Resistance to Scratching" was modified for the requirements of the present invention. The apparatus uses a pneumatically driven sledge with five metal fingers (250 mm long). One end of each metal finger was fixed while the other end was supplied with an interchangeable scratch pin with a stainless steel tip (1.0 mm in diameter). The pins were loaded with different weights to exert standard forces on the surface of the test material. The loads were increased, as allowed in the Ford Laboratory Test Method, in order to meet the required scratch forces on the surface of the samples. The loading forces are reported in Newtons (N).

Scratch finger No.
1 20.0 N
2 15.0 N
3 10.0 N
4 5.0 N
5 2.0 N

The test specimens were cut or molded to 100 mm×150 mm in dimension and conditioned at room temperature for more than 24 hours prior to testing. The test plaques were placed under the five metal fingers of the apparatus and pushed by hand from right to left at a sliding velocity of approximately 100 mm per second. All tests were performed once for each plaque at room temperature. Upon completion of the test, the specimens were then evaluated visually on a numerical scale of 1 to 5 where:

| Scratch Rating | Description |
| --- | --- |
| 1 | No visible scratch |
| 1.5 | Gloss change without deformation |
| 2 | Slight deformation |
| 2.5 | Moderate deformation |
| 3 | Slight ribbing in scratch |
| 3.5 | Frequent ribbing |
| 4 | Continuous ribbing |
| 4.5 | Points of tearing |
| 5 | Continuous tearing |

The evaluations for the heaviest stylus loadings (20N and 15N) are reported in the following examples. FIG. 1 is a visual representation of the Scratch Rating Scale showing a composite of five (5) views under an optical light microscope at 40× magnification. Deformation is defined as a permanent indentation on the surface of the test specimen. Ribbing is defined as crescent lines or ripples formed inside the scratch. Tearing is caused when the scratch apparatus breaks the surface of the test specimen.

Examples of prior art blends are included in Controls 1–4, shown in Table 1. Representative compositions of blends of the current invention, and physical properties thereof, are found in Examples 1–5, also shown in Table 1. This data shows that polyolefin resin blends having excellent scratch and mar resistance and good impact strength, while having a wide range of physical properties, can be made using compositions of this invention.

TABLE 1

| Polymer of | Cont.1 | Cont. 2 | Cont. 3 | Cont. 4 | Ex. 1 | Ex. 2 | Ex. 3 | Ex. 4 |
| --- | --- | --- | --- | --- | --- | --- | --- | --- |
| Polypropylene, %[1] | 100 | 62.5 | 62.5 | 62.5 | 62.5 | 75 | 55 | 65 |
| Polypropylene, %[2] | — | — | — | — | — | — | 10 | — |
| Polyethylene, %[3] | — | — | — | — | — | — | 10 | — |
| HSBR, %[4] | — | — | — | — | — | — | — | 10 |
| PP-g-MA, %[5] | — | 22.5 | 22.5 | 22.5 | 20.8 | 13.9 | 13.9 | 13.9 |
| Ethylene/Octene, %[6] | — | 1.5 | — | — | — | — | — | — |
| SEBS, %[7] | — | — | 15 | — | — | — | — | — |
| SEBS-g-MA, %[8] | — | — | — | 15 | 13.9 | 9.3 | 9.3 | 9.3 |
| Metal Ion, %[9] | — | — | — | — | 2.8 | 1.8 | 1.8 | 1.8 |
| Anti-oxidant, pph[10] | 0.4 | 0.4 | 0.4 | 0.4 | 0.4 | 0.4 | 0.4 | 0.4 |
| MFR, 230/2.16 (dg/min) | 13.1 | 21.3 | 22.8 | 23.6 | 7.0 | 9.45 | 10.1 | 9.0 |
| Flexural Modulus (kpsi) | 268 | 192 | 198 | 190 | 211 | 213 | 204 | 149 |
| Tensile Strength (psi) | 5677 | 4498 | 4392 | 4454 | 4748 | 4917 | 4793 | 4263 |
| Impact resistance (ft-lb/in) | 0.66 | 1.49 | 2.05 | 1.73 | 2.81 | 1.94 | 2.18 | 11.8 |
| MAI1 Fail mode, 23° C. | brittle | ductile | ductile | ductile | ductile | ductile | ductile | ductile |
| Scratch on surface at 20 N | 2.0 | 3.0 | 3.0 | 3.0 | 2.5 | 2.0 | 2.5 | 2.5 |
| Scratch on surface at 15 N | 2.0 | 2.5 | 2.5 | 2.5 | 2.0 | 2.0 | 2.0 | 2.0 |

[1]Polypropylene homopolymer with MFR = 12 dg/min.
[2]Polypropylene block copolymer with MFR = 35 dg/min.
[3]High density polyethylene with Melt Index = 8.45 dg/min.
[4]Hydrogenated styrene butadiene random copolymer.
[5]Polypropylene functionalized with maleic anhydride (MA) with MFR = 110 dg/min.
[6]Copolymer of ethylene/1-octene.
[7]Hydrogenated styrenic elastomer, SEBS block copolymer.
[8]Hydrogenated styrenic elastomer, SEBS block copolymer functionalized with maleic anhydride.
[9]Metal ion containing compound such as zinc acetate.
[10]Irganox B-225.

Preferred polyolefin resin blends of this invention had a scratch rating of 2.5 or less at a 20N loading, showing only moderate deformation with no ribbing or tearing; or a scratch rating of 2.0 or less at a 15N loading, showing only slight deformation with no ribbing or tearing. At the same time, the polyolefin resin blends of the invention had excellent impact resistance and flexural modulus.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the chemical details of every design and embodiment may be slightly different or modified by one of ordinary skill in the art without departing from the blends and methods taught by the present invention.

What is claimed is:

1. A polyolefin resin blend comprising:
    from about 10 to 90 weight percent of a semi-crystalline polyolefin;
    from about 0.1 to about 50 weight percent of a propylene-based polyolefin-metal salt that is a reaction product of a propylene-containing homopolymer or copolymer and at least one organic monomer containing at least one hydrophilic moiety, the reaction product being at least partially neutralized with at least one metal ion; and
    from about 0.1 to about 50 weight percent of a reaction product of styrenic block ionomer component modified with at least one polar group, the reaction product being at least partially neutralized with at least one metal ion.

2. The polyolefin resin blend of claim 1 wherein the semi-crystalline polyolefin comprises from about 15 to about 85 weight percent, the propylene-based polyolefin-metal salt comprises from about 1 to about 45 weight percent, and the modified styrenic block ionomer component comprises from about 1 to about 45 weight percent of the polyolefin resin blend.

3. The polyolefin resin blend of claim 1 wherein the semi-crystalline polyolefin comprises from about 20 to about 80 weight percent, the propylene-based polyolefin-metal salt comprises from about 2 to about 40 weight percent, and the modified styrenic block ionomer component comprises from about 2 to about 40 weight percent of the polyolefin resin blend.

4. The polyolefin resin blend of claim 1 where the semi-crystalline polyolefin comprises: one or more of homopolymers of propylene, homopolymers of ethylene, copolymers of propylene and a $C_2$ to $C_{20}$ alpha-olefin component, copolymers of ethylene and a $C_3$ to $C_{20}$ alpha-olefin component, or mixtures thereof.

5. The polyolefin resin blend of claim 1 wherein each hydrophilic moiety and each polar group each independently comprises an alpha, beta-ethylenically unsaturated carboxylic acid or carboxylic anhydride monomer, or a mixture thereof.

6. The polyolefin resin blend of claim 5 wherein each hydrophilic moiety and each polar group each independently comprises methacrylic acid, acrylic acid, maleic anhydride, or a mixture thereof.

7. The polyolefin resin blend of claim 1 wherein the styrenic block ionomer component comprises a styrenic block segment and an elastomeric block segment that is optionally hydrogenated.

8. The polyolefin resin blend of claim 7 wherein the styrenic block copolymer comprises styrene-ethylene/butylene, styrene-ethylene/butylene-styrene, styrene-ethylene/propylene, styrene-ethylene/propylene-styrene, styrene-ethylene/propylene-styrene-ethylene-propylene, styrene butadiene, styrene-butadiene-styrene, styrene-butylene-styrene, styrene-butylene-butadiene-styrene, styrene-isoprene-styrene, or combinations thereof.

9. The polyolefin resin blend of claim 1 wherein the blend further comprises a polymeric metal salt that is a reaction product of a random styrenic copolymer which is comprised of at least one unsaturated dicarboxylic acid derivative incorporated into the styrene backbone; and at least one metal ion present in an amount sufficient to at least partially neutralize each unsaturated dicarboxylic acid derivative.

10. The polyolefin resin blend of claim 9, wherein the random styrenic copolymer comprises styrene-maleic anhydride.

11. The polyolefin resin blend of claim 1 wherein each metal ion independently comprises lithium, sodium, potassium, magnesium, calcium, barium, lead, tin, zinc, aluminum or a combination thereof.

12. The polyolefin resin blend of claim 1 further comprising an impact modifier in an amount from about 0.1 to about 40 weight percent.

13. The polyolefin blend of claim 12 wherein the impact modifier is present in an amount from about 1 to about 20 weight percent and comprises a styrenic block copolymer, an hydrogenated styrene butadiene random copolymer, or mixtures thereof.

14. The polyolefin resin blend of claim 1 further comprising a mineral filler in an amount from about 1 to about 40 weight percent.

15. The polyolefin resin blend of claim 14 wherein the mineral filler is present in an amount from about 5 to about 25 weight percent and comprises talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

16. An article comprising the polyolefin resin blend of claim 1.

17. A method of preparing an article from a polyolefin resin blend which comprises:
    melt blending a semi-crystalline polyolefin resin component, a propylene-based polyolefin-metal salt that is a reaction product of a propylene-containing polymer functionalized with an organic monomer containing a hydrophilic moiety and at least one metal ion present in an amount sufficient to at least partially neutralize the hydrophilic moiety, and from about 0.1 to about 50 weight percent of a styrenic block ionomer component modified with at least one polar group, the reaction product being at least partially neutralized with at least one metal ion, so as to form a blend, wherein the melt blending is at a sufficiently high temperature so that each polymer is at least partially melted; and
    molding the blend into an article having a surface, wherein the surface of the article when subjected to a 20 Newton load has less than about a 3 on the scratch rating scale and has no ribbing or tearing.

18. The method of claim 17 wherein the semi-crystalline polyolefin comprises from about 15 to about 85 weight percent, the propylene-based polyolefin-metal salt comprises from about 1 to about 45 weight percent, and the styrenic block ionomer component comprises from about 1 to about 45 weight percent of the melt blend.

19. The method of claim 17 wherein each hydrophilic moiety and each polar group each independently comprises an alpha, beta-ethylenically unsaturated carboxylic acid or carboxylic anhydride monomer, or a mixture thereof.

20. The method of claim 19 wherein each hydrophilic moiety and each polar group each independently comprises methacrylic acid, acrylic acid, maleic anhydride, or a mixture thereof.

21. The method of claim 17 wherein the styrenic block ionomer component comprises styrene-ethylene/butylene, styrene-ethylene/butylene-styrene, styrene-ethylene/propylene, styrene-ethylene/propylene-styrene, styrene-ethylene/propylene-styrene-ethylene-propylene, styrene butadiene, styrene-butadiene-styrene, styrene-butylene-styrene, styrene-butylene-butadiene-styrene, styrene-isoprene-styrene, or combinations thereof.

22. The method of claim 17 which further comprises melt blending a polymeric metal salt that is a reaction product of a random styrenic copolymer which is comprised of at least one unsaturated dicarboxylic acid derivative incorporated into the styrene backbone and at least one metal ion present in an amount sufficient to at least partially neutralize each unsaturated dicarboxylic acid derivative, and wherein each metal ion independently comprises lithium, sodium, potassium, magnesium, calcium, barium, lead, tin, zinc, aluminum or a combination thereof.

23. The method of claim 17 further comprising providing an impact modifier in an amount from about 0.1 to about 40 weight percent which comprises a styrenic block copolymer, an hydrogenated styrene butadiene random copolymer, or mixtures thereof.

24. The method of claim 17 further comprising providing a mineral filler in an amount from about 1 to about 40 weight percent that comprises talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

* * * * *